United States Patent
Hoetzel

(10) Patent No.: US 7,628,303 B2
(45) Date of Patent: Dec. 8, 2009

(54) METHOD OF MECHANICALLY BREAKING A SCRIBED WORKPIECE OF BRITTLE FRACTURING MATERIAL

(75) Inventor: Bernd Christoph Hoetzel, Woerrstadt (DE)

(73) Assignee: Schott AG, Mainz (DE)

(*) Notice: Subject to any disclaimer, the term of this patent is extended or adjusted under 35 U.S.C. 154(b) by 267 days.

(21) Appl. No.: 11/438,162

(22) Filed: May 22, 2006

(65) Prior Publication Data

US 2006/0266783 A1 Nov. 30, 2006

(30) Foreign Application Priority Data

May 27, 2005 (DE) .................. 10 2005 024 497

(51) Int. Cl.
*B26F 3/00* (2006.01)

(52) U.S. Cl. .......................... 225/5; 225/103

(58) Field of Classification Search ............. 225/5, 225/96.5, 103–105
See application file for complete search history.

(56) References Cited

U.S. PATENT DOCUMENTS

| | | | | |
|---|---|---|---|---|
| 2,793,471 | A | * | 5/1957 | Kurata ................... 225/96.5 |
| 2,853,907 | A | * | 9/1958 | Bakke ..................... 225/103 |
| 3,259,286 | A | * | 7/1966 | Le Gras ................... 225/2 |
| 3,567,086 | A | * | 3/1971 | Wark et al. .............. 225/2 |
| 4,277,143 | A | | 7/1981 | Pauli et al. |
| 5,609,284 | A | | 3/1997 | Kondratenko |
| 5,984,159 | A | | 11/1999 | Ostendarp et al. |
| 6,087,759 | A | | 7/2000 | Pfeil |
| 6,576,149 | B1 | | 6/2003 | Matsuzawa |
| 2003/0019897 | A1 | | 1/2003 | Chuang et al. |
| 2003/0148057 | A1 | | 8/2003 | Dietz et al. |
| 2003/0151717 | A1 | | 8/2003 | Shin |
| 2005/0061123 | A1 | | 3/2005 | Park |

FOREIGN PATENT DOCUMENTS

| | | |
|---|---|---|
| CH | 626 596 | 11/1981 |
| DE | 196 49 332 | 1/1998 |
| DE | 100 16 628 | 10/2001 |
| DE | 102 57 544 | 7/2004 |
| EP | 0 062 484 | 10/1982 |
| EP | 0 872 303 | 10/1998 |
| EP | 1 122 584 | 8/2001 |
| EP | 1 264 803 | 12/2002 |

* cited by examiner

*Primary Examiner*—Kenneth E. Peterson
(74) *Attorney, Agent, or Firm*—Michael J. Striker

(57) ABSTRACT

The method for mechanically breaking a flat workpiece of brittle fracturing material includes scribing spaced-apart parallel scribed lines in respective perpendicular cutting directions on the flat workpiece, especially a flat glass plate, with a laser and, after that, mechanically breaking the flat workpiece along the laser-scribed lines. In this way the flat workpiece can be divided into smaller rectangular workpieces. At least one breaking roller is used to break the flat workpiece along the scribed lines in one cutting direction. To improve the break edge quality and provide a higher yield a breaking bar that is shorter than the smaller of the width and the length of the flat workpiece is used to break the flat workpiece along the scribed lines in the other cutting direction and the breaking bar is pressed against each of those scribed lines in successive overlapping steps.

5 Claims, 4 Drawing Sheets

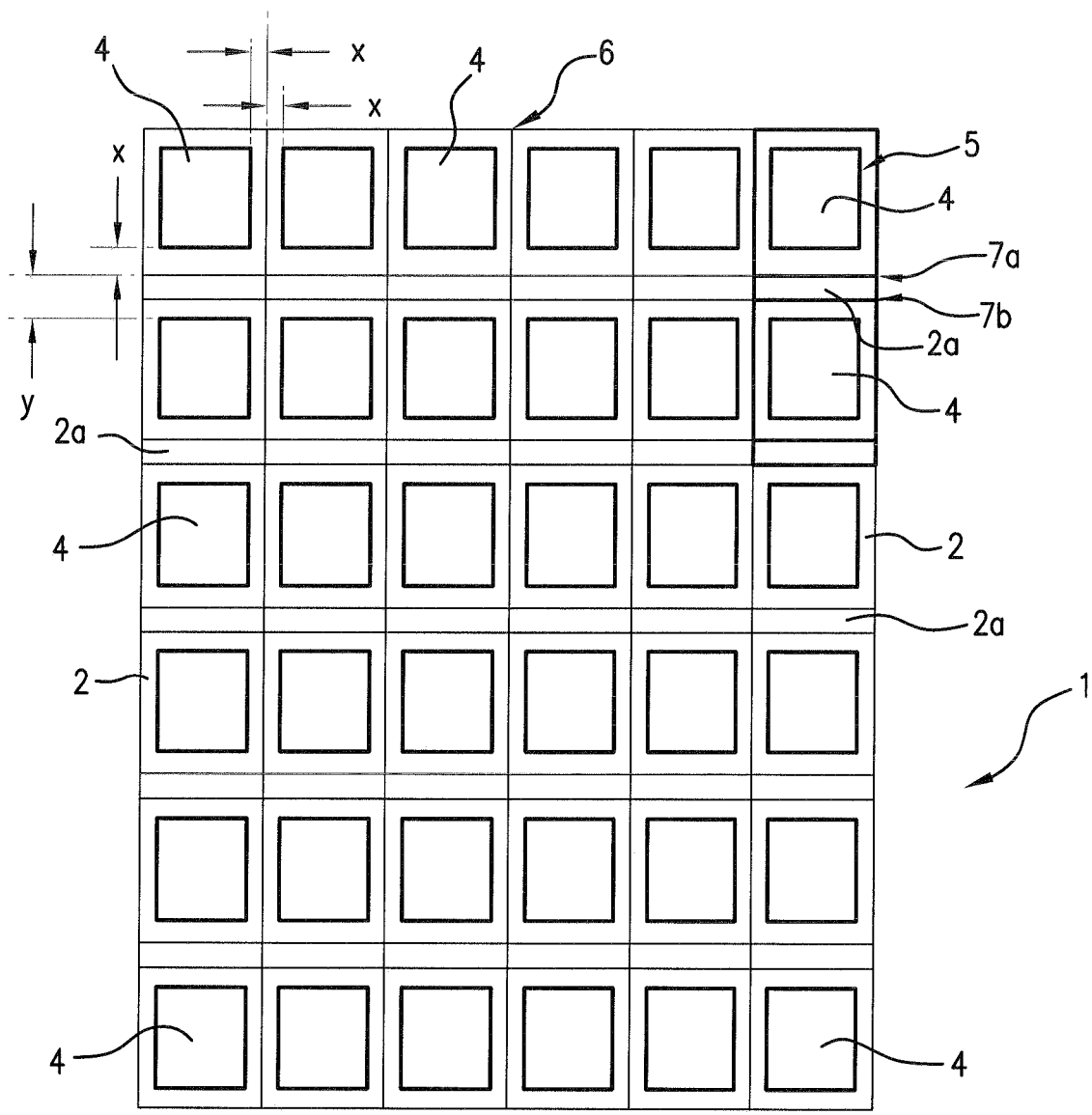
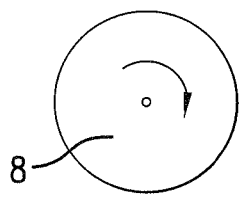 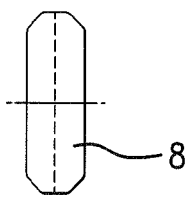 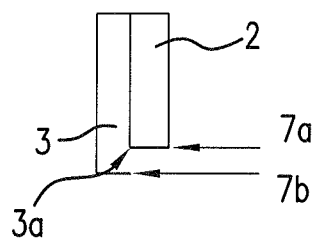
FIG.1
FIG.2a  FIG.2b  FIG.3

METHOD OF MECHANICALLY BREAKING A SCRIBED WORKPIECE OF BRITTLE FRACTURING MATERIAL

BACKGROUND OF THE INVENTION

1. Field of the Invention

The present invention relates to a method of mechanically breaking a parallel scribed or scored workpiece of brittle fracturing material, especial flat glass, in two cutting directions that are perpendicular to each other, by breaking tools. One breaking tool is a breaking roller used to break along one cutting direction and the other breaking tool is a breaking bar used to break along the other cutting direction.

2. Related Art

Small rectangular flat glass elements are necessary for numerous technical applications.

Small containers, which are closed on at least one side completely or partially by a thin glass pane, are used for housing micro- and opto-electronic components, such as quartz oscillators, SAW filters and CCD components in so-called "electronic packaging". Frequently also housing covers made from thin glass panes are used for housing of micro-opto-electronic and opto-electronic components. The thickness s of these small thin glass panes is typically in a range from 10 µm$\leq$s$\leq$500 µm.

Small thin glass panes are also used as structural parts in the manufacture of micro-electronic and micro-mechanical components. Thus, for example, a quartz oscillator positioned between two thin glass sheets and connected with them is known from DE 196 49 332.

Thin glass panes used as closure elements of housings for micro- and opto-electronic components and structural parts of micro-electronic and micro-mechanical components are attached typically by gluing or soldering. Metal or glass solder is used as the joining material in the case of soldering. Glass solder is used in the majority of applications.

The manufacture of small rectangular glass panes for displays of electronic units, such as mobile phones, digital cameras, etc., is an especially interesting application. The so-called display cell, which comprises two glass panes glued to each other, plays a special role. The one glass pane is a TFT substrate (thin film transistor) and the other is the CF substrate (color front). These glass substrates typically are borosilicate glass with a thickness of between 0.2 and 1.1 µm.

The economical manufacture of this sort of small rectangular glass pane occurs according to the state of the art by dividing or breaking apart a larger rectangular flat glass plate or slab, as described for example in DE 100 16 628 A1. Edge quality requirements have become more stringent, since that has a decisive influence on the strength of the resulting small rectangular glass panes.

However the display cells are also made in a corresponding way by dividing a large double flat glass plate, as described, e.g., in U.S. Pat. No. 4,277,143. Up to 200 display cells, which correspond in size to the display format for a mobile phone, can be cut out of the double flat glass plate according to the layout.

A laser beam is currently used to a large extent to cut the respective flat glass plates into rectangles. This technique is widely known and does not need to be described in further detail here. Reference is made here to EP 0 872 303 A2, U.S. Pat. No. 5,609,284 and EP 0 062 484 A1 for this purpose. The cutting is basically performed by guiding a laser beam with a following cooling spot by means of a scanner linearly along a provided dividing line on a flat glass plate so that the glass is not cut through, but is only scribed up to a predetermined depth by inducing a thermo-mechanical stress. The scribing occurs first completely in a coordinated direction and after that in the other perpendicular direction. Subsequently the glass plate is mechanically broken along the scribed lines, typically by a machine, as it rests on a so-called breaking table.

In the case of a double flat glass plate first the one flat glass plate and subsequently the other flat glass plate are scribed and broken in order to make display cells.

The breaking along the perpendicular dividing or cutting directions takes place sequentially, advantageously according to DE 102 57 544 A1, i.e. each flat glass plate is first broken along the scribed lines by the second cutting device and subsequently along the scribed lines by the first cutting device. It has been shown that glass plates can be divided into the described small rectangular elements with a higher broken edge quality and higher yield with this breaking technique.

The machine breaking of the scribed flat glass plate occurs in a known manner by means of a so-called breaking bar in connection with a breaking roller according to US Published Patent Application 2005/0061123 A1. This sort of breaking bar comprises a longitudinally extended metallic blade with knife edge on one side, to which typically a different material, e.g. hard rubber, is applied so that the glass is not damaged.

The breaking force of the breaking bar, which is pressed successively using a mechanized breaking apparatus with controlled force along the scribed line on the scribed glass plate under stress with the scribed side on the breaking table, is comparatively large, so that the glass breaks comparatively "hard" due to the exerted "impacts". In the known case a very long breaking bar is used, which extends over the entire width and/or length of the flat glass plate to be broken into separate pieces. Since the dimensions of the flat glass plate to be divided and/or the double flat glass plate are always increasing in the interest of greater efficiency, the metallic blade of the breaking bar becomes correspondingly longer, which impairs the maintenance of the required cutting accuracy, which is in a range from 5 to 10 µm. In the known case the breaking occurs along one dividing or cutting direction by means of the breaking roller and the breaking occurs along the other dividing or cutting direction by means of the breaking bar.

SUMMARY OF THE INVENTION

It is an object of the present invention to provide an improved method of the above-described kind for mechanically breaking, especially using a mechanized breaking apparatus, a flat workpiece of brittle fracturing material, especially a flat glass plate, in an economical manner with good break edge quality while maintaining the required high accuracy.

This object and others, which will be made more apparent hereinafter, is attained in a method of mechanically breaking a scribed or scored flat workpiece made of brittle fracturing material, particularly glass, along respective cutting directions that are perpendicular to each other by at least one breaking roller for breaking the flat workpiece along one of the cutting directions and by a breaking bar for breaking the flat workpiece along the other of the cutting directions.

According to the invention the breaking bar has a length that is shorter than the smallest of a length and a width of the flat workpiece and the breaking bar is used in predetermined overlapping steps along the associated cutting direction.

The method of the invention can divide a flat workpiece, especially a flat glass plate, into smaller flat workpieces in an economical manner and with high accuracy which is in a range of 5 to 10 μm and with a high break edge quality.

Preferred embodiments of the invention are described in the appended dependent claims and will be apparent from the description of the preferred embodiments in connection with the drawing.

BRIEF DESCRIPTION OF THE DRAWING

The objects, features and advantages of the invention will now be illustrated in more detail with the aid of the following description of the preferred embodiments, with reference to the accompanying figures in which:

FIG. 1 is a schematic top plan view of a double flat glass plate, which is divided along dividing lines, which are perpendicular to each other, into 36 small display cells;

FIGS. 2a and 2b are respective side and sectional views of a breaking roller or breaking the double flat glass plate along scribed dividing lines;

FIG. 3 is a schematic cross-sectional view through a single display cell obtained by the method according to the invention;

DETAILED DESCRIPTION OF THE INVENTION

Figure 4A:
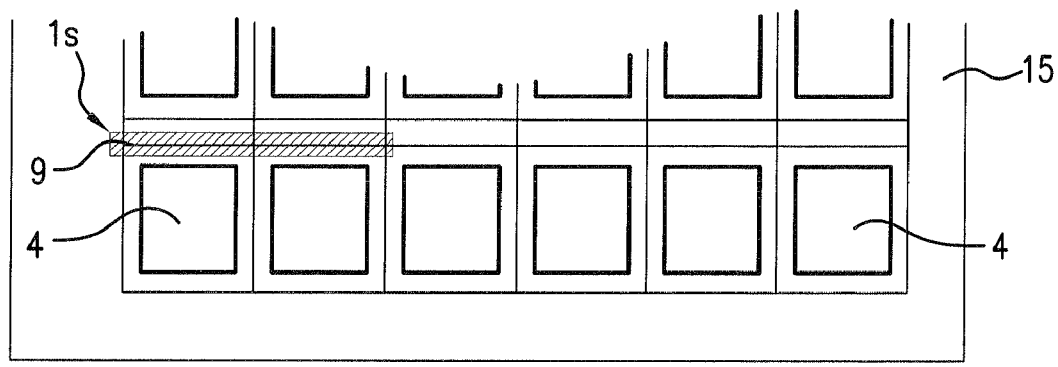
FIGS. 4a, 4b and 4c are respective action views showing how a breaking bar is applied successively along a horizontal dividing line scribed on the flat glass plate when the method according to the invention is performed.

FIG. 1 is a top plan view of a double flat glass plate 1, which comprises two flat glass plates bonded with each other. The double flat glass plate 1 comprises a flat glass plate 2 provided with a color filter on the front side of the double flat glass plate 1 and a TFT flat glass plate 3 on the rear side, which is covered by the front flat glass plate 2, as shown in FIG. 1. This double flat glass plate 1 should be divided into 36 display cells 4, which comprise respective rectangular pieces of the flat glass plate 2 with the color filter and the TFT flat glass plate 3, which are bonded together in the later formed display cell by a bonding frame 5 of adhesive or glass solder arranged between them.

Figure 5A:
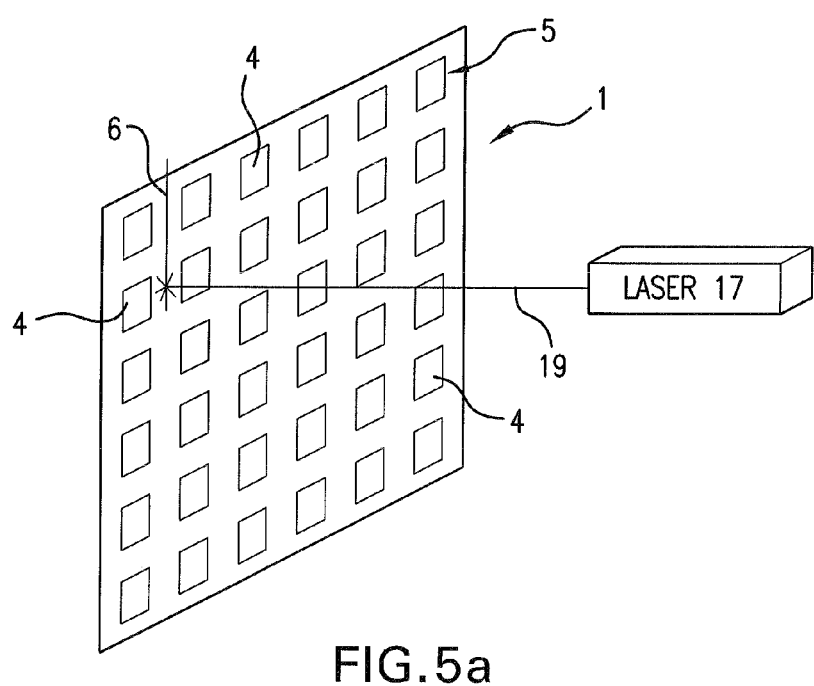
FIGS. 5a and 5b are respective perspective action views showing how the scoring to form the dividing lines between the bonding frames is performed with a laser beam generated by a laser.
Figure 5B:
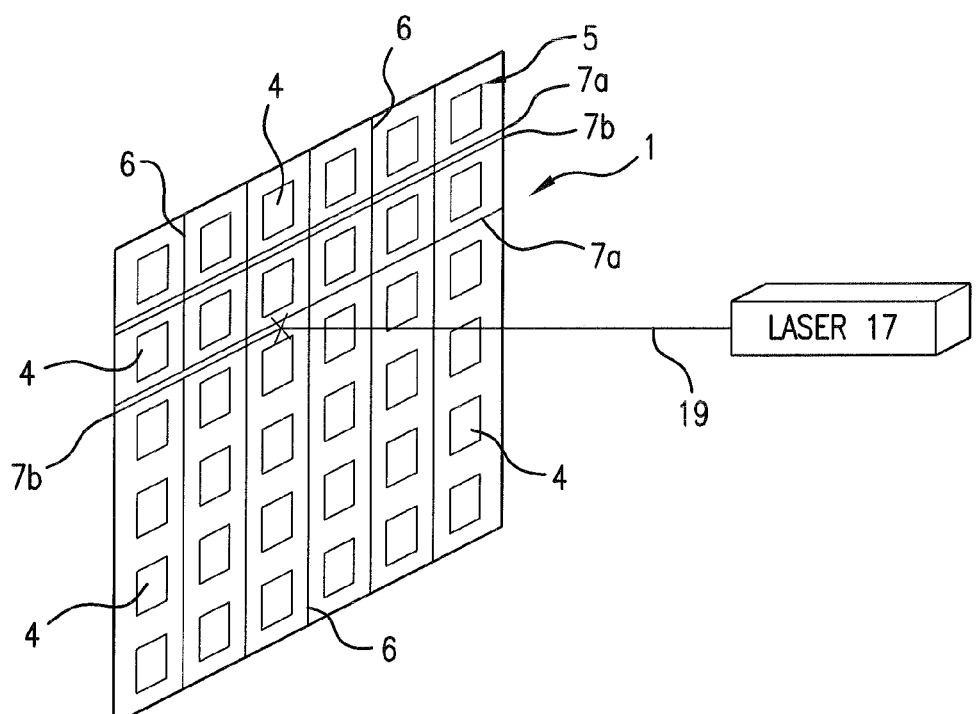

The double flat glass plate 1 is scribed or scratched along the predetermined dividing lines 6; 7a, 7b between outer edges of adjacent bonding frames 5 on both sides of the dividing lines by means of a laser 17 shown in FIGS. 5a and 5b according to a known method, in order to divide the double flat glass plate 1 into individual display cells 4. During the laser scribing it is necessary to provide only one dividing line 6 in the vertical direction between neighboring cells 4, since the respective distances "x" between the dividing line 6 and the outer edges of the adjacent bonding frames 5 of the adjacent cells 4 are equal, i.e. in so far as symmetry exists as shown in FIG. 1. In contrast, two dividing lines 7a, 7b are scribed in the horizontal direction on the front side of the front flat glass plate 2 between neighboring horizontal rows of cells 4. These two horizontal dividing lines 7a, 7b consist of a dividing line 7a extending along the outer edges of the bonding frames 5 of the neighboring upper display cells 4 as seen in FIG. 1 and a dividing line 7b extending along the outer edges of the bonding frames 5 of the neighboring lower display cells 4 as seen in FIG. 1. Because of the two dividing lines 7a, 7b between the neighboring horizontal rows of cells 4, it is guaranteed that a small strip 2a between neighboring horizontal rows of cells 4 can be cut out from the front flat glass plate 2, so that a step 3a for an electrical connecting strip is provided.

The rear flat glass plate 3 is thus scribed only along dividing lines 7b.

In contrast to the vertical dividing lines the horizontal dividing lines 7a and 7b are designed to provide an asymmetry, as expressed by the different spacing dimensions "x" and "y" as shown in FIG. 1.

The division of the double flat glass plate 1 occurs according to the following method:

First parallel scribed lines are produced with a predetermined spacing along the dividing lines 6 and the dividing lines 7a, 7b that are perpendicular to the dividing lines 6 on one side of the double flat glass plate 1, preferably the front side. After that the double flat glass plate 1 is placed on a so-called breaking table 15 (see FIGS. 4a to 4b) with the scribed side facing down and held fixed on it by a vacuum. In the first breaking step the double flat glass plate 1 is fractured along the dividing lines 6 with a first work tool, at least one breaking roller. Also the breaking roller 8, which is shown in FIGS. 2a and 2b, is guided exactly over the laser-scribed line 6. The pressing force of the breaking roller 8 produces tension in the glass and is conducted through the thickness of the glass plate, i.e. the glass is completely broken along the scribed line 6 with the breaking roller 8.

The breaking roller 8 typically comprises hard rubber. The breaking roller breaks the glass very gently. Primarily the glass does not experience a sudden shock or impact. Since the breaking roller tool is very small, a plurality of breaking rollers 8 can be used in parallel at the same time along parallel dividing lines 6. For this purpose the pressing force of each individual breaking rollers 8 can be separately controlled. Because of the parallel use of plural breaking rollers 8 the first breaking can occur very rapidly along the vertical dividing lines 6, although the fractures or breaks only open as the rollers move along the scribed lines.

After the breaking along the dividing lines 6 by the breaking rollers 8, the double flat glass plate 1 held on the breaking table by vacuum with the scribed lines face down is broken in a second step along the second direction, i.e. along the dividing lines 7a, 7b. The breaking tool used in the second step is a breaking bar 9. The breaking force applied by the breaking bar 9 is very much higher than that applied by the breaking roller, i.e. the supporting structure of the machine making the cells 4 must be correspondingly strengthened. Generally structural parameters and breaking forces prevent the simultaneous use of plural breaking bars along parallel scribed lines.

However since the blade of the breaking bar extends over plural vertical dividing lines, the horizontal breaking occurs comparatively rapidly.

Figure 4B:
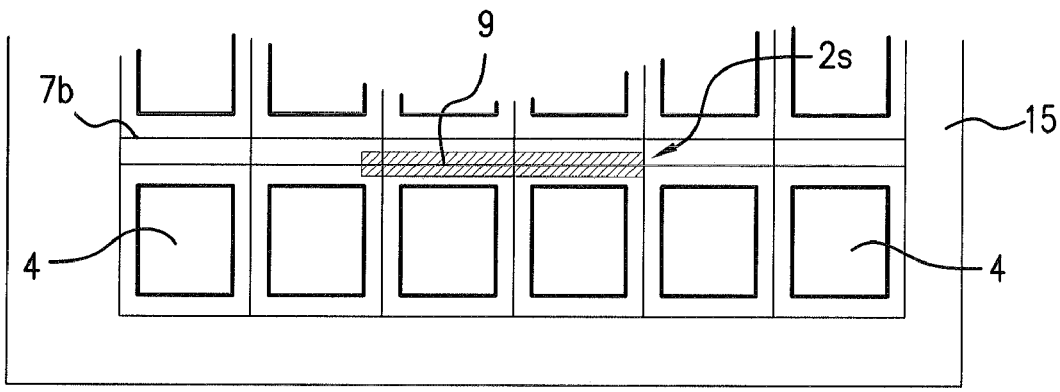
Figure 4C:
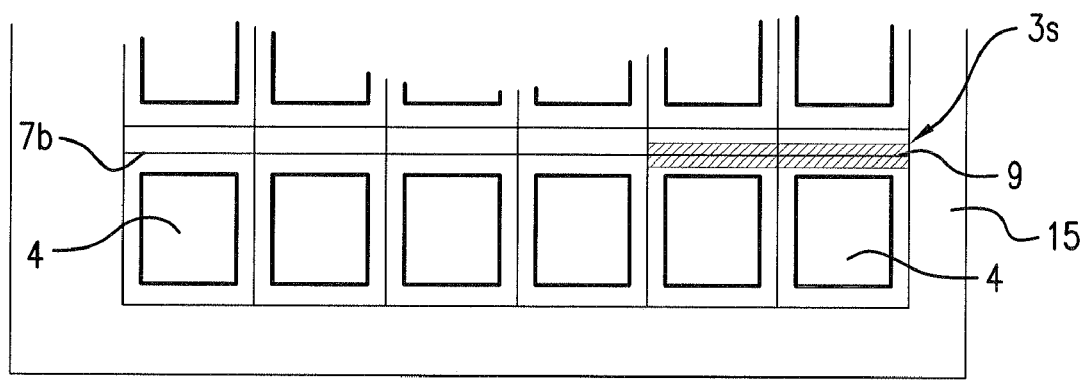

It has been shown that it is appropriate to make the length of the blade of the breaking bar 9 not equal to the associated dimension of the flat glass plate, here its horizontal width, because this would especially impair the precision of the break or fracture. Preferably, as shown in FIGS. 4a, 4b and 4c, the breaking bar 9 is used with a shorter blade, which extends over somewhat more than two vertical lines 6. This breaking bar 9 with the shorter blade is placed over a horizontal scribed line 7a or 7b several times in succession in a somewhat overlapping manner as shown in operation in FIGS. 4a, b and c. In FIGS. 4a, 4b and 4c respectively three breaking steps 1s, 2s and 3s are shown, which overlap to a minor extent. In other words the front edge of the blade of the breaking bar 9 is applied three times in succession on the associated horizontal dividing line 7a and its intersection with the vertical dividing lines 6.

In this way a clean separation is attained even at the intersection points of the dividing lines 6 and 7a, 7b.

The breaking along the scribed lines 7a, 7b also occurs in the illustrated example with a breaking bar, because the possibility exists to provide asymmetric breaking or separation. Symmetry in the breaking region is defined with respect to the bonding frame, which is applied between the flat glass plates 2, 3. From FIG. 1 one sees that the breaking roller dividing line 6 has exactly the same distance "x" to the bonding frame 5 on the left and to the bonding frame 5 on the right. This symmetric arrangement allows the use of a breaking roller.

However in the horizontal direction the respective distances of the dividing lines 7a, 7b to the adjacent bonding frames 5 are different (y>x) and thus this arrangement is asymmetric. If a breaking roller were to be used along the dividing lines 7a, 7b, no perpendicular fracture or break would arise, but a break that has so-called lancets extending from the perpendicular laser scribed line in the glass. The breaking along the horizontal dividing lines with the breaking bar avoids this because the breaking bar opens the break or fissure over its entire length at the same time. In contrast the breaking roller opens the break or fissure at a point that travels with the breaking roller as it moves over the dividing line.

However the breaking with the breaking bar is of similar good quality as the quality of the breaking with the breaking roller.

After the breaking of the one flat glass plate the—still together—the second flat glass plate is scribed and double flat glass plate 1 is turned over. After the scribing of the second flat glass plate the double flat glass plate is again positioned with the scribed side down on the breaking table and put under stress. The breaking occurs in the same way as with the first flat glass plate.

This method produces very good quality edges, which are formed vertical and without lancets.

The scribing or scoring of the flat glass plates preferably occurs by means of a laser beam 19 generated by the laser 17 as shown in FIGS. 5a and 5b. However in principle it is also conceivable to scribe the flat glass plates mechanically. For example, a conventional cutting roller can be used to scribe the flat glass plates.

Mechanically scribed workpieces or workpieces scribed with a laser, especially display cells, which comprise two glass substrates and are glued together, may be divided with the breaking method according to the invention with the two tools in only a certain sequence of steps. The use of the two different special tools, which are used according to the layout, is a special feature of this method. These two tools are a breaking roller, which must be used first in the method of the invention and a breaking bar.

The disclosure in German Patent Application 10 2005 024 497.1-45 of May 27, 2005 is incorporated here by reference. This German Patent Application describes the invention described hereinabove and claimed in the claims appended hereinbelow and provides the basis for a claim of priority for the instant invention under 35 U.S.C. 119.

While the invention has been illustrated and described as embodied in a method of mechanically breaking a scribed workpiece of brittle fracturing material, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

I claim:

1. A method of mechanically breaking a double-bonded flat glass plate, said double-bonded flat glass plate comprising two flat glass plates bonded to each other by an array of bonding frames, said bonding frames being arranged in rows and columns between the two flat glass plates, said method comprising the steps of:
    a) scribing a first group of parallel scribed lines in the double-bonded flat glass plate by means of a laser in a first cutting direction, wherein respective parallel scribed lines of said first group are arranged between corresponding adjacent columns of the bonding frames;
    b) scribing a second group of parallel scribed lines in the double-bonded flat glass plate by means of said laser in a second cutting direction that is perpendicular to the first cutting direction, wherein two parallel scribed lines of said second group are arranged between adjacent rows of the bonding frames, so that each of said two parallel lines is asymmetrically placed with respect to the bonding frames of the adjacent rows;
    c) mechanically breaking the double-bonded flat glass plate along the parallel scribed lines of the first group with at least one breaking roller; and
    d) mechanically breaking the double-bonded flat glass plate along the parallel scribed lines of the second group with a breaking bar applied in three successive steps that overlap to a minor extent along each of the parallel scribed lines of the second group, which are oriented in the second cutting direction;
    wherein the breaking bar comprises a metallic blade extending longitudinally in the second cutting direction with a length that is approximately one third of a dimension of the double-bonded flat glass plate in the second cutting direction.

2. The method as defined in claim 1, wherein the at least one breaking roller comprises plural breaking rollers and said mechanically breaking the double-bonded flat glass plate along the parallel scribed lines of the first group occurs using plural breaking rollers in parallel at the same time along the parallel scribed lines of the first group.

3. The method as defined in claim 1, wherein said double-bonded flat glass plate consists of said two flat glass plates bonded to each other by said bonding frames, said double-bonded flat glass plate has a front side and a rear side, said first group and said second group of said parallel scribed lines are scribed on the front side of said double-bonded flat glass plate, and further comprising prior to said mechanically breaking placing the double-bonded flat glass plate with the front side face down on a breaking table and then performing the mechanical breaking of the double-bonded flat glass plate along the first group of the parallel scribed lines with the at least one breaking roller and the mechanical breaking of the double-bonded flat glass plate along the second group of the parallel lines.

4. The method as defined in claim 1, wherein up to 200 of said bonding frames are present between said two flat glass plates and each of said bonding frames corresponds in size to a display format of a mobile phone.

5. A method of mechanically breaking a double-bonded flat glass plate, said double-bonded flat glass plate comprising two flat glass plates bonded to each other by an array of bonding frames, said bonding frames being arranged in rows and columns between the two flat glass plates, said method comprising the steps of:

a) scribing a first group of at least five parallel scribed lines in the double-bonded flat glass plate by means of a laser in a first cutting direction, wherein respective parallel scribed lines of said first group are arranged between corresponding adjacent columns of the bonding frames;

b) scribing a second group of parallel scribed lines in the double-bonded flat glass plate by means of said laser in a second cutting direction that is perpendicular to the first cutting direction, wherein two parallel scribed lines of said second group are arranged between adjacent rows of the bonding frames, so that each of said two parallel lines is asymmetrically placed with respect to the bonding frames of the adjacent rows;

c) mechanically breaking the double-bonded flat glass plate along the parallel scribed lines of the first group with at least one breaking roller; and d) mechanically breaking the double-bonded flat glass plate along the parallel scribed lines of the second group with a breaking bar in successive overlapping steps along each of the parallel scribed lines of the second group that is oriented in the second cutting direction;

wherein the breaking bar comprises a metallic blade extending longitudinally in the second cutting direction with a length that is slightly more than twice a distance between adjacent scribed lines of the first group; and wherein from 36 to 200 of said bonding frames are present between said two flat glass plates and each of said bonding frames corresponds in size to a display format of a mobile phone.

* * * * *